United States Patent [19]
Ellis

[11] Patent Number: 4,660,943
[45] Date of Patent: Apr. 28, 1987

[54] NIGHT VISION SYSTEMS

[75] Inventor: Stafford M. Ellis, West Sussex, England

[73] Assignee: GEC Avionics Limited, England

[21] Appl. No.: 806,105

[22] Filed: Dec. 6, 1985

[30] Foreign Application Priority Data

Dec. 17, 1984 [GB] United Kingdom ............... 8431820

[51] Int. Cl.$^4$ ..................... G02B 23/12; G02B 23/18
[52] U.S. Cl. .................................. 350/538; 350/547; 350/145
[58] Field of Search ............... 350/538, 547, 174, 146, 350/145, 548, 549

[56] References Cited

U.S. PATENT DOCUMENTS

| | | | |
|---|---|---|---|
| 2,625,855 | 1/1953 | Gaylor | 350/549 |
| 3,503,146 | 3/1970 | Woplin | 350/174 |
| 4,188,090 | 2/1980 | Ellis | 350/174 |
| 4,449,787 | 5/1984 | Burbo et al. | 350/538 |

FOREIGN PATENT DOCUMENTS 1113768 7/1954 France ................. 350/549

Primary Examiner—Jon W. Henry
Attorney, Agent, or Firm—Kirschstein, Kirschstein, Ottinger & Israel

[57] ABSTRACT

A night vision system comprising a helmet (1) having a transparent visor (13 or 15) before or movable to a position before the eye positions (IL, IR) of an observer wearing the helmet and a night vision device (19) having two eye pieces (22L, 22R), one for each eye, supported dependant from the helmet (11) so as to present the eye pieces (22L, 22R) of the device (19) at a short distance before the helmet wearer's eye positions and the visor (13 or 15). The device (19) is supported by means of a four-bar linkage arrangement (A,B,C,D) which constrains the eye pieces (22L, 22R) for rotational movement about the respective eye positions (IL, IR) between different operative positions, and so that the eye pieces (22L, 22R) do not make contact with the visor (13 or 15) during eye piece movement.

18 Claims, 6 Drawing Figures

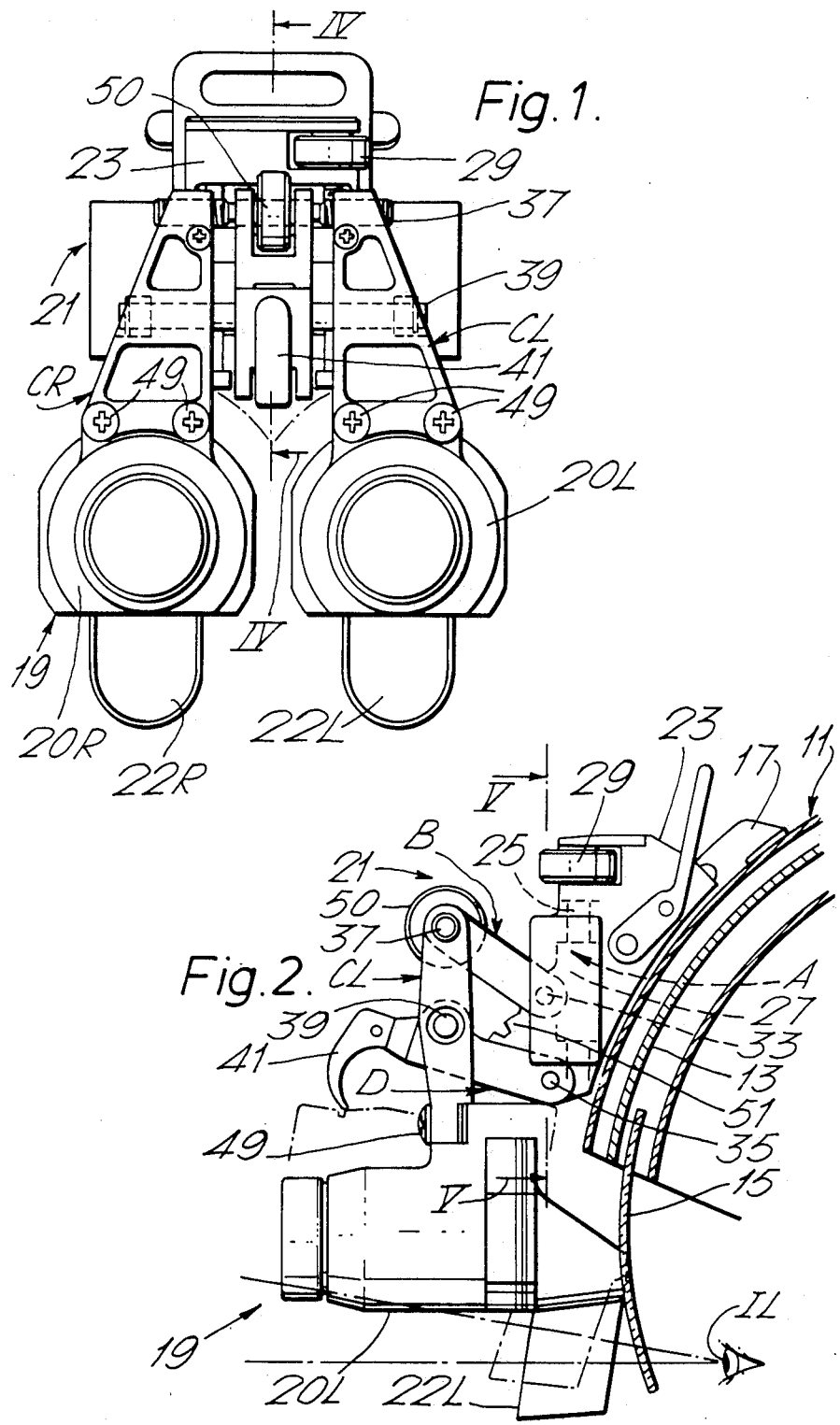

NIGHT VISION SYSTEMS

BACKGROUND OF THE INVENTION

This invention relates to night vision systems.

More particularly the invention relates to night vision systems of the kind (hereafter referred to as the kind specified) comprising: a helmet having a transparent visor before, or movable to a position before, the eye positions of a wearer of the helmet; a night vision device having two eye pieces one for each eye of said wearer; and means for supporting said night vision device on the helmet so as to present the eye pieces to the helmet wearer at respective positions before said eye positions and said visor.

SUMMARY OF THE INVENTION

It is an object of the present invention to provide a night vision system of the kind specified including provision for varying the viewing direction of the night vision device.

Accordingly, in a night vision system of the kind specified said means supporting said night vision device comprises a four-bar linkage arrangement which constrains the night vision device for movement along a path between a first operative position and a second operative position giving a viewing direction tilted with respect to the viewing direction in the first operative position, said path of movement being such that, in respect of each eye piece, the fore and aft axis of that eye piece when said device is in said first operative position intercepts the fore and aft axis of that eyepiece when said device is in said second operative position substantially at the eye position corresponding to that eyepiece, and such that the eyepieces do not make contact with said visor.

In one particular system in accordance with the invention said four-bar linkage arrangement comprises a first link element constituted by a member mounted on said helmet, second and third link elements each of which is pivoted to said first element at a respective one of two spaced positions on said first element, and a fourth link element which at each of two spaced positions is pivoted to a respective one of said second and third elements, said device being mounted on said fourth element.

BRIEF DESCRIPTION OF THE DRAWINGS

One night vision system in accordance with the invention is hereinafter described, by way of example, with reference to the accompanying drawings in which:

FIG. 1 depicts a front elevation of a night vision device incorporated in the system and a support therefore.

FIG. 2 depicts the night vision device with a portion of a helmet and a visor in section and includes a side view of the device support;

DETAILED DESCRIPTION OF THE PREFERRED EMBODIMENTS

Figure 3:
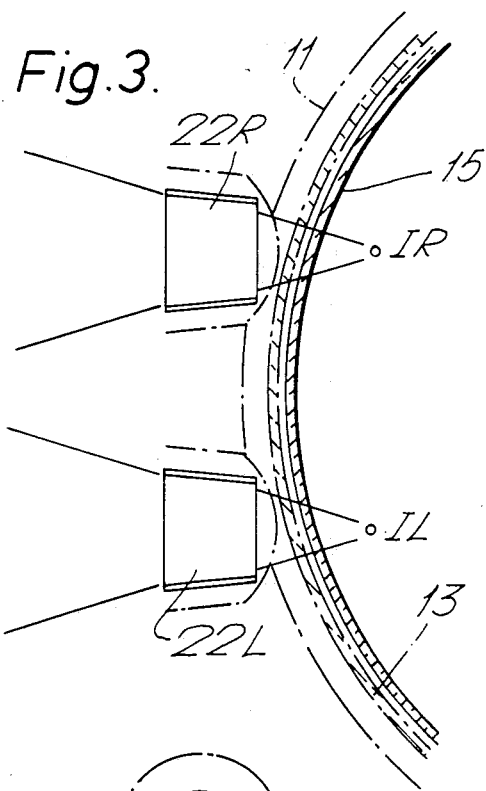
FIG. 3 is a scrap plan view related to FIG. 2.

Referring to the drawings, the night vision system includes a helmet 11 having pivotal visors, 13, 15, the visor 15 being shown lowered for use in FIG. 2. The helmet 11 has secured to it, at a position just above the top of the face aperture of the helmet, a plate 17 on which a night vision goggle device is detachably mounted via means 21, by engagement with the plate 17 so as to be supported dependent from the helmet 11 in front of the face of a wearer of the helmet.

The night vision goggle 19 comprises two body portions 20L and 20R respectively, each housing an optical system including, inter alia, an objective and an image intensifier, neither of which are visible. There are, associated with the body portions 20L and 20R, eyepieces 22L and 22R which are respectively presented to the helmet wearer at positions before the left and right eye positions IL and IR of the wearer, and in front of the visor 13 or 15 in use.

The night vision goggle 19 is suitably of a form described in further detail in patent specification No. GB-A-2144558 and the specification of U.S. Pat. No. 4,563,061.

The goggle mounting means 21 comprises a bracket 23, which engages the plate 17, a lead screw 25, rotatable about a nominally vertical axis in the bracket 23, a carriage 27 in threaded engagement with the lead screw 25 so as to permit adjustment of the carriage 27 by means of a knurled wheel 29 on the lead screw 25 in the direction of the axis of the lead screw 25, and a four-bar linkage described in detail below. A guide post 31 constrains the carriage 27 against motion other than in the direction of the axis of lead screw 25.

The four-bar linkage comprises four link elements or bars A, B, C and D which are pivotally connected for relative rotation about nominally horizontal axes, i.e. axes parallel to a line joining the eye positions. Link element A is defined in the carriage 27 and it is constituted by that part of the carriage which extends between two pivot pins 33 and 35 fixed in the carriage. The link element B is angularly displaceable at one end about the pin 33; the link element D is angularly displaceable at one end about the pin 35.

The fourth link element C is in two parts CL and CR ganged together by means of a transverse lead screw 37 and a transverse guide pin 39. The end of the link element B which is remote from the pivot pin 33 is pivotally connected to the lead screw 37.

The end of the link element D which is remote from the pivot pin 35 is pivotally connected to the pin 39. Beyond the pin 39 there is a handle 41 which is connected to a rod 43 which is received in a passage in the link D. A helical spring 45 bears at one end on an abutment 47 on the rod 43. At its other end the spring 45 bears against a reaction surface around the receiving passage in the link D. The spring 45 is under compression around the rod 43. The two body portions 20L and 20R of the goggle 19 are rigidly attached to the bottom margins of the link parts CL and CR by means of screws 49.

The transverse lead screw 37 permits adjustment by means of a knurled wheel 50 of the spacing between the body portions 20L and 20R and hence eyepieces 22L and 22R to suit the helmet wearer's ocular spacing.

The carriage 27 has a lower portion in the form of a toothed sector 51. The compression spring 45 on the rod 43 attached to the handle 41 urges the rod 43 inwardly so that a nose part 53 at the end of the rod abutment 47 normally engages the toothed section 51.

Figure 4:
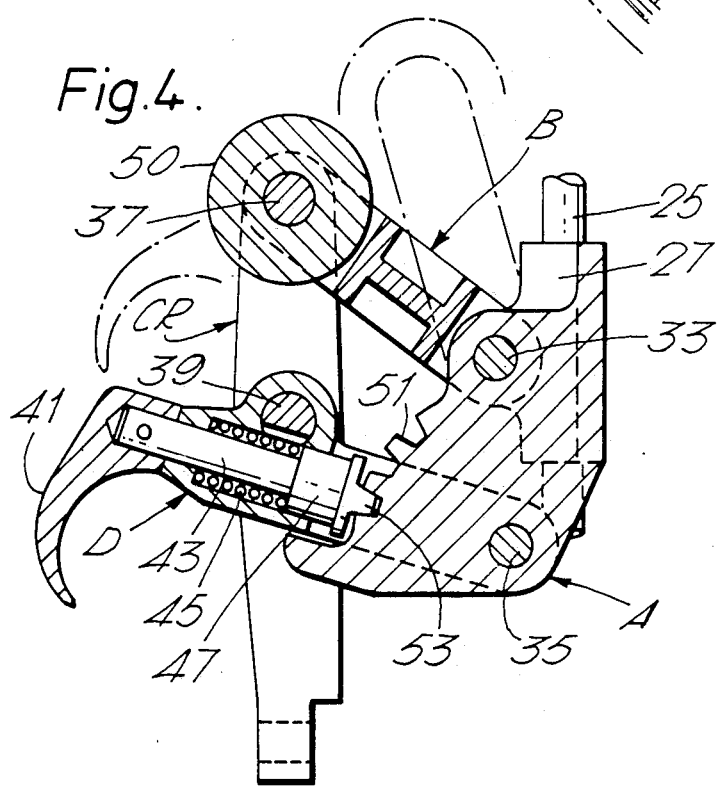
FIG. 4 shows on an enlarged scale a section taken on the centre line IV-IV in FIG. 1.
Figure 5:
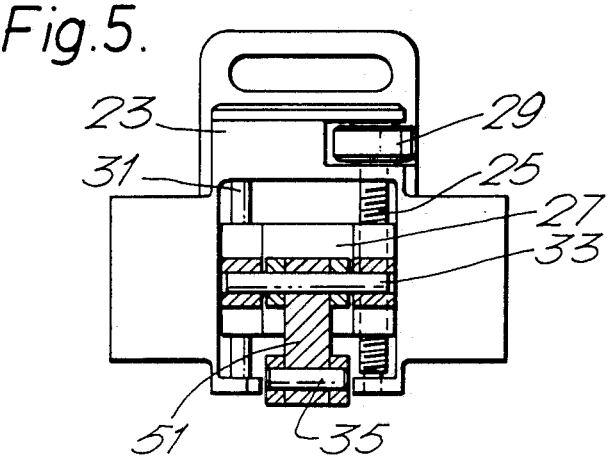
FIG. 5 shows a part section on the line V-V of FIG. 2.
Figure 6:
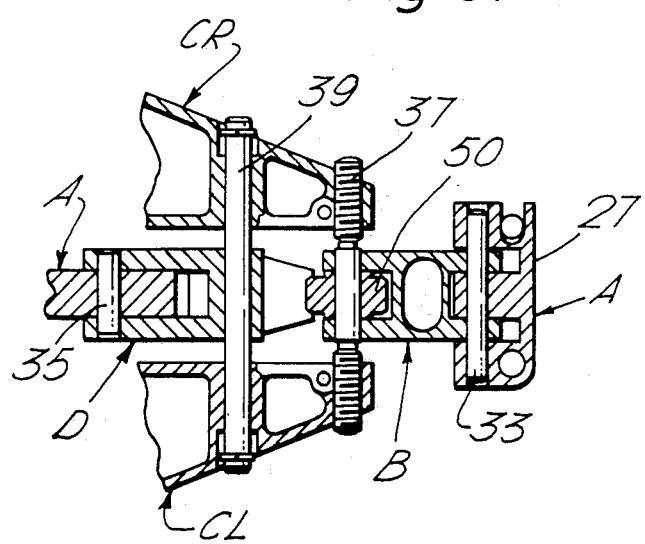
FIG. 6 depicts a developed section through the support.

The linkage (see particularly FIG. 4) is not a parallel motion linkage. It is designed so that, after freeing the nose part 53 of the rod 43 from its lower end position of engagement with the sector 51 of the carriage 27, by outwards movement of the handle 41 against the spring bias, and upwards movement of the handle 41, the goggle with of course its eyepieces, is tilted upwardly through 10° from the position shown in solid line to a position shown in chain dotted line in FIG. 2. The latter position corresponds to the end position of engagement with the sector 51 remote from the lower end position, i.e the higher end position. By releasing the handle the goggle 1 is secured in the new position.

Between these two end positions there is of course an intermediate location at which the goggle 19 may be retained by engagement between the nose part 53 and the toothed sector 51.

As indicated in FIG. 2, in respect of each eyepiece 22L or 22R the fore and aft axes of the eyepiece for the two end positions intercept at the helmet wearer's eye position IL or IR corresponding to that eyepiece 22L or 22R. Whilst the said fore and aft axes do not intercept the eye positions IL, IR exactly with the goggle 19 latched at the intermediate detent position, the variance is of very small magnitude so that for practical purposes the said axes may be considered to intercept the positions IL, IR for all positions of the goggle 19.

Moreover goggle 19 and hence the eyepieces 22L, 22R, whilst behaving in motion as though for a rotation about the positions IL and IR, also experience a translational motion more particularly a motion forwards, away from the eye positions IL, IR and hence the helmet 11 and visor 15 as the goggle 19 moves upwards. This translational motion ensures that there is no fouling of the visor in use by the eyepieces in moving between the lower extreme generally horizontal position (solid line) and the upper extreme upwardly tilted position (shown chain dotted).

It will be understood that the goggle 19 in all three detent positions is in an operative position, that is to say, a position in which the scene forward of a wearer of the helmet 11 may be viewed through the goggle 19.

It will be appreciated that whilst in the system described by way of example two visors 13, 15 are mounted on the helmet so as to be movable between operative and inoperative positions, in other systems in accordance with the invention there may be a single movable visor or a single visor fixed to the helmet in an operative position.

I claim:

1. A night vision system comprising: a helmet; a transparent visor which in use is positioned before two eye positions within the helmet at which the eyes of a wearer of the helmet are respectively positioned in use of the system, a night vision device having two eye pieces one for each eye of said wearer; and means for supporting said night vision device on the helmet so as to present the eye pieces to the helmet wearer at respective positions before said eye positions and said visor, said means supporting said night vision device comprising a four-bar linkage arrangement which constrains the night vision device for movement along a path of movement between a first operative position and a second operative position giving a viewing direction tilted with respect to the viewing direction in the first operative position, said path of movement being such that, in respect of each eye piece, the fore and aft axis of that eye piece when said device is in said first operative position intercepts the fore and aft axis of that eye piece when said device is in said second operative position substantially at the eye position corresponding to that eye piece, and such that the eye pieces do not make contact with said visor.

2. A system according to claim 1 wherein said first and second operative positions are at respective ends of the available movement of said device along said path.

3. A system according to claim 1 wherein at positions of said device along said path other than said first and second positions said fore and aft axes also substantially intercept at said eye positions.

4. A system according to claim 1 wherein said path is such that said device experiences a translational motion with respect to said eye positions as it moves upwardly along said path.

5. A system according to claim 4 wherein said translational motion is a motion forwards, away from said eye positions.

6. A system according to claim 1 wherein said supporting means is secured to said helmet at a position above the top of a face aperture of the helmet.

7. A system according to claim 1 wherein said four-bar linkage arrangement comprises: a first link element constituted by a member mounted on said helmet; second and third link elements each of which is pivoted to said first element at a respective one of two spaced positions on said first element; and a fourth link element which at each of two spaced positions is pivoted to a respective one of said second and third elements, said device being mounted on said fourth element.

8. A system according to claim 7 wherein said link elements are pivoted to one another for rotation about axes extending substantially parallel to a line joining said eye positions.

9. A system according to claim 7 wherein said device is mounted on a downward extension of said fourth link element below said two spaced pivotal positions on said fourth link element.

10. A system according to claim 7 including adjustment means for adjusting the position of said linkage arrangement, and hence said device with respect to said helmet in a nominally vertical direction.

11. A system according to claim 10 wherein said adjustment means comprises a rotatable lead screw which is mounted on said helmet and which is in threaded engagement with said first link element.

12. A system according to claim 7 wherein said fourth link element comprises two parts one on either side of said second and third link elements, each of which parts carries a respective one of said eye pieces.

13. A system according to claim 12 including adjustment means for adjusting the spacing between said two parts of said fourth link element in a direction substantially parallel to a line joining said eye positions.

14. A system according to claim 13 wherein said adjustment means comprises a rotatable lead screw which is carried on one of said second and third link elements and which is in threaded engagement with each of said two parts of said fourth link element.

15. A system according to claim 1 including a detent mechanism whereby said device may be locked in any selected one of a plurality of different positions along said path of movement.

16. A system according to claim 15 wherein said detent mechanism comprises a toothed sector mounted on said helmet and a co-öperating spring loaded member incorporated in a link element of said linkage arrangement.

17. A system according to claim 16 wherein said spring loaded member includes a handle to facilitate movement of said device along said path of movement whilst the detent mechanism is disengaged.

18. A system according to claim 1 wherein said visor is mounted on said helmet so as to be movable between operative and inoperative positions.

* * * * *